United States Patent
Samala

(10) Patent No.: US 11,699,277 B2
(45) Date of Patent: *Jul. 11, 2023

(54) CLASSIFICATION WITH SEGMENTATION NEURAL NETWORK FOR IMAGE-BASED CONTENT CAPTURE

(71) Applicant: Open Text SA ULC, Halifax (CA)

(72) Inventor: Sreelatha Reddy Samala, Los Altos, CA (US)

(73) Assignee: OPEN TEXT SA ULC, Halifax (CA)

( * ) Notice: Subject to any disclaimer, the term of this patent is extended or adjusted under 35 U.S.C. 154(b) by 184 days.

This patent is subject to a terminal disclaimer.

(21) Appl. No.: 17/222,940

(22) Filed: Apr. 5, 2021

(65) Prior Publication Data

US 2021/0224577 A1 Jul. 22, 2021

Related U.S. Application Data

(63) Continuation of application No. 16/381,962, filed on Apr. 11, 2019, now Pat. No. 10,977,524.

(51) Int. Cl.
*G06T 7/00* (2017.01)
*G06V 10/26* (2022.01)
(Continued)

(52) U.S. Cl.
CPC .......... *G06V 10/26* (2022.01); *G06F 18/2178* (2023.01); *G06F 18/2413* (2023.01);
(Continued)

(58) Field of Classification Search
CPC ........ G06K 9/627; G06K 9/6263; G06T 5/20; G06T 7/11; G06T 2207/20036;
(Continued)

(56) References Cited

U.S. PATENT DOCUMENTS

2019/0228559 A1* 7/2019 Xue .................. G06N 3/08
2020/0151503 A1* 5/2020 Wang ............... G06K 9/627
2020/0327360 A1 10/2020 Samala

OTHER PUBLICATIONS

Office Action for U.S. Appl. No. 16/381,962, dated Aug. 17, 2020, 9 pages.
(Continued)

*Primary Examiner* — Ping Y Hsieh
(74) *Attorney, Agent, or Firm* — Sprinkle IP Law Group

(57) ABSTRACT

A segmentation neural network is extended to provide classification at the segment level. An input image of a document is received and processed, utilizing a segmentation neural network, to detect pixels having a signature feature type. A signature heatmap of the input image can be generated based on the pixels in the input image having the signature feature type. The segmentation neural network is extended from here to further process the signature heatmap by morphing it to include noise surrounding an object of interest. This creates a signature region that can have no defined shape or size. The morphed heatmap acts as a mask so that each signature region or object in the input image can be detected as a segment. Based on this segment-level detection, the input image is classified. The classification result can be provided as feedback to a machine learning framework to refine training.

20 Claims, 11 Drawing Sheets

(51) Int. Cl.
    *G06T 5/20*          (2006.01)
    *G06T 7/11*          (2017.01)
    *G06F 18/2413*    (2023.01)
    *G06F 18/21*       (2023.01)
    *G06V 30/19*       (2022.01)
    *G06V 10/82*       (2022.01)
    *G06V 30/413*     (2022.01)

(52) U.S. Cl.
    CPC .................. *G06T 5/20* (2013.01); *G06T 7/11* (2017.01); *G06V 10/82* (2022.01); *G06V 30/1916* (2022.01); *G06V 30/19173* (2022.01); *G06V 30/413* (2022.01); *G06T 2207/20036* (2013.01); *G06T 2207/20081* (2013.01)

(58) Field of Classification Search
    CPC .......... G06T 2207/20081; G06V 10/82; G06V 30/1916; G06V 30/19173; G06V 10/26; G06V 30/413
    See application file for complete search history.

(56)             References Cited

OTHER PUBLICATIONS

Notice of Allowance for U.S. Appl. No. 16/381,962, dated Dec. 9, 2020, 2 pages.

* cited by examiner

CLASSIFICATION WITH SEGMENTATION NEURAL NETWORK FOR IMAGE-BASED CONTENT CAPTURE

RELATED APPLICATION(S)

This application is a continuation of, and claims a benefit of priority under 35 U.S.C. § 120 from, U.S. patent application Ser. No. 16/381,962, filed Apr. 11, 2019, now U.S. Pat. No. 10,977,524, entitled "CLASSIFICATION WITH SEGMENTATION NEURAL NETWORK FOR IMAGE-BASED CONTENT CAPTURE," which is hereby incorporated by reference herein for all purposes.

TECHNICAL FIELD

This disclosure relates generally to the field of data processing through artificial intelligence. More particularly, this disclosure relates to classification with segmentation neural network for image-based content capture and processing.

BACKGROUND OF THE RELATED ART

Today, optical character recognition (OCR) can be found in many products on the market. To recognize text in a scanned image in a portal document format (PDF) file, for instance, a user only needs to invoke an OCR function and the OCR function can return a relatively satisfactory result (e.g., recognized text with over 90 percent accuracy) at the speed of a few seconds per page. Unfortunately, the same cannot be said about object detection and recognition technologies. One reason is because identifying objects, including objects that might include textual information (e.g., signatures, icons, etc.), in images is significantly more difficult than identifying texts in images. Adding to this difficulty is the amount of documents that would need to be captured and processed in a timely and efficient manner, particularly for growing enterprises. As a result, humans can no longer review, analyze, and obtain information from documents without the help of automated systems.

Traditionally, automated document processing systems are programmed by humans with task-specific algorithms and rules. Such systems do not scale well and lack the ability to adapt and learn. With advancements made in computational power, computer hardware, and machine learning (ML) techniques in recent years, researchers have begun to explore the possibility of using artificial intelligence (AI) for automated, scalable, and more intelligent document processing.

Deep learning (DL) is part of ML methods in the field of AI. DL architectures utilize artificial neural networks (ANNs) capable of learning from sample data. Convolutional NN (CNN) is a class of deep NNs that can be applied to analyze and classify images. Multiple deep NNs, including the deep convolutional neural networks (DCNNs), have been developed by researchers in various attempts to train computer systems to perform image classification tasks (e.g., localization, detection, and segmentation). However, even with the computational power and ML methods available today, it can still take a very long time (e.g., weeks) and a massive amount of data samples (e.g., 35,000 sample documents) to train a machine to accurately recognize image objects and perform image classification. Consequently, there is room for innovations and improvements.

SUMMARY OF THE DISCLOSURE

An object of the invention is to expedite the learning process of a machine and help the machine to learn better, faster, and more efficient. In embodiments disclosed herein, this and other objects can be realized by extending a segmentation neural network so that classification can be performed, not at the pixel level or after the learning process is complete, but at the segment level while the learning process is ongoing.

In some embodiments, an image processing method that implements an extended segmentation neural network can include receiving an input image; detecting, utilizing a segmentation neural network, pixels in the input image having a signature feature type; generating, based on the pixels in the input image having the signature feature type, a signature heatmap of the input image; generating, from the signature heatmap, a morphed heatmap; detecting a signature object or region in the input image by masking the input image using the morphed heatmap; and classifying, based at least on the signature object or region, the input image.

As described below, the input image can be an image of a physical document or a simulated document created from document components. In some cases, the majority of the document can be text. The document may or may not have any handwriting (referred to herein as "signature") on it. When a document that has a signature is used in training the extended segmentation neural network, it is referred to as a positive example. When a document that does not have a signature is used, it is referred to as a negative example.

In this disclosure, the segmentation neural network outputs a probability distribution of the signature feature type in the image. This probability distribution can be used to generate a signature heatmap that indicates, at the pixel level, the probability of each pixel's feature type being that of a signature.

In some embodiments, the signature heatmap is morphed to remove or obscure details in the input image. The loss of details at this stage actually increases the amount of information or "noise" that the machine can use to learn about a region or part of interest. This morphing can be done, for instance, by applying one or more morphological image processing operations such as dilation, erosion, blurring, etc. This step essentially creates a mask that can be used to focus on the regions or parts of interest in the input image which, in turn, can significantly reduce the learning time.

The masked image, with any region or part of interest detected as a segment, is input to a classification neural network which tries to infer, based on the detected segment (s), whether the input image contains a signature. This classification neural network and the additional heatmap processing are part of the extended segmentation neural network. The segment-level classification result can be provided to the machine learning framework as feedback to refine the training. This allows the machine to learn continuously and improve the accuracy of the overall image classification. With only segmentation loss, accuracy of the segmentation output plateaus after a while. With additional classification loss, the segmentation accuracy improves significantly. In essence, segmentation boosts the classification in the forward process and the segmentation-level classification branch enhances the segmentation during the backward process (backward is feedback). The network has two outputs that can be applied depending on usage: 1) segmentation and classification output both or 2) segmentation output or classification output independently. As disclosed herein, segmentation output with the new segmentation-level classification branch for training is far better than segmentation output without the segmentation-level classification branch.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
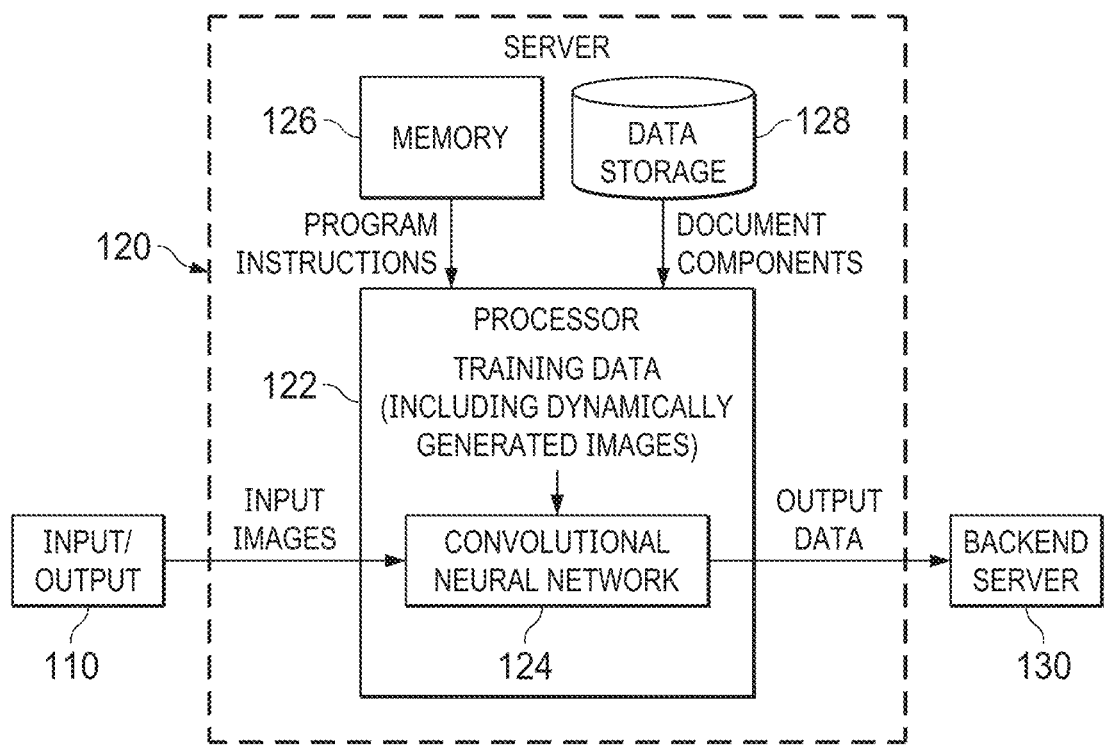
FIG. 1 depicts a diagrammatic representation of an exemplary system for extracting information from images according to some embodiments.

FIG. 1 depicts a diagrammatic representation of an exemplary system for extracting information from images and providing this information to a downstream computing facility. In this system, an input/output (I/O) device 110 is provided to capture images from which data is to be extracted. Examples of I/O device 110 can include, but are not limited to, a mobile phone, a camera, a document scanner, a digital document storage, or any other device suitable for inputting images to the system. I/O device 110 provides images of physical documents (e.g., driver's licenses, photographs, faxes, any printed documents, etc.) to server 120. Server 120 can be configured for receiving and processing the images from I/O device 110 to extract information from the images. Server 120 utilizes processor 122 that receives program instructions from memory 126 which implement CNN 124. The program instructions can be further configured to enable processor 122 to dynamically generate simulated documents and images of these simulated documents from document components which are stored in data storage 128. The images of the simulated documents, as well as the information contained in the document components, can be used to train CNN 124. The trained CNN can identify areas within the input images, which can contain text, images, signatures, and/or other information, received from I/O device 110 and generate an outcome. The outcome can be provided to a downstream computing facility, which represents a consumer of the information. In this example, such a consumer can be a data storage device, a backend server (e.g., backend server 130), a user, or any other consumer of the outcome.

The documents and images that are dynamically generated by processor 122 may also be referred to herein as "dynamically generated," "artificial," "simulated," or "synthetic" to indicate that the documents and images are created by the system using the document components, rather than being copies of pre-existing documents or images of these pre-existing documents. For example, a dynamically generated document to simulate a driver's license may be constructed using randomly selected document components such as a name, address, photograph, driver's license number, license format, etc. The simulated document is not associated with a real person, but instead represents a fictitious person. The components individually may contain either real or fictitious information (e.g., an actual, physical address or a fictitious address). It should be noted that, for purposes of this disclosure, a "simulated" image is a real image, but it is an image of a simulated document that has been created from the document components.

As discussed above, the images of the simulated documents, as well as the information contained in the document components, can be used to train CNN 124. This training is necessary because, while a human can easily identify objects in a document image (e.g., a face, an address, a seal, a signature, etc.) and instantaneously recognize a type of the document in the image (e.g., a driver's license, a certificate, a contract, etc.), these tasks are far more challenging for a machine to learn. Training helps the machine to learn by positive examples as well as negative examples.

The training of CNN 124, which can be done in an offline manner, can include preparing a training data set and a testing data set. As a non-limiting example, this preparation can include providing document components such as faces, signatures, names addresses, and the like to a simulated document generator. The simulated document generator, in turn, can generate simulated documents and simulated document images from the document components. The simulated document images can be partitioned into a training data set (e.g., using 80% of the simulated document images thus generated) and a testing data set (e.g., using 20% of the simulated document images thus generated). CNN 124 can then be trained using the training data set and the information from the document components. This training process conventionally requires vast quantities of actual data. The use of a simulated data generator to generate simulated document images from document components internally, and provide the simulated document images and information about the document components as input to CNN 124 can eliminate the need for a data source to supply the large numbers of actual document images needed for the training. Additional details of the exemplary system shown in FIG. 1 can be found in U.S. patent application Ser. No. 16/035,307, filed on Jul. 13, 2018, Publication No. 2019/0019020 A1, entitled "SYSTEMS AND METHODS FOR IMAGE BASED CONTENT CAPTURE AND EXTRACTION UTILIZING DEEP LEARNING NEURAL NETWORK AND BOUNDING BOX DETECTION TRAINING TECHNIQUES," which is incorporated by reference herein.

CNN124 is different from known DL architectures. Generally, a DL architecture such as LeNet-5 has seven layers—three convolutional layers, two subsampling (pooling) layers, one fully connected layer, and one output layer. The convolutional layers typically use 5×5 convolutions, while typical values for the subsampling layers are 2×2. More specifically, the input is usually a 32×32 grayscale image which passes through the first convolutional layer with 6 feature maps (filters) having a size of 5×5 and a stride of 1. The image dimensions are reduced from 32×32×1 to 28×28×6. The second layer is an average pooling layer with a filter size of 2×2 and a stride of two. The image dimensions are again reduced from 28×28×6 to 14×14×6. To keep the number of connections within reasonable bounds, in the third layer (which is the second convolutional layer), only 10 out of 16 feature maps are connected to the 6 feature maps of the previous layer. The image dimensions are again reduced from 14×14×6 to 10×10×16. The fourth layer is another average pooling layer with a filter size of 2×2, a stride of two, and 16 feature maps. The image dimensions are reduced from 10×10×16 to 5×5×16 (or, 400 nodes). The fifth layer is a fully connected convolutional layer with 120 feature maps, each of which has a size of 1×1 and is connected to all 400 nodes in the previous layer. Tan h sigmoid ("tan h") activations are used throughout the layers except the output layer. The seventh layer, which is the output layer, has 10 neurons or nodes. These neurons have hand-coded weights representing a 7×12 binary mask. This forces the network to transform the 120 feature maps of the fifth layer into an internal representation in a fully connected layer (the sixth layer) with 84 units. In the output layer, a normalized exponential function ("softmax") is applied to the input vector (a dimension of 84 units) to generate a distribution of probabilities which can then be used for classification purposes. In ML, classification refers to the problem of identifying to which of a set of categories or classes a new observation belongs, based on a training data set containing observations whose category or class membership is known. With this DL architecture, once trained, a machine can classify an object within an image by recognizing an object class to which the object might belong.

Figure 2:
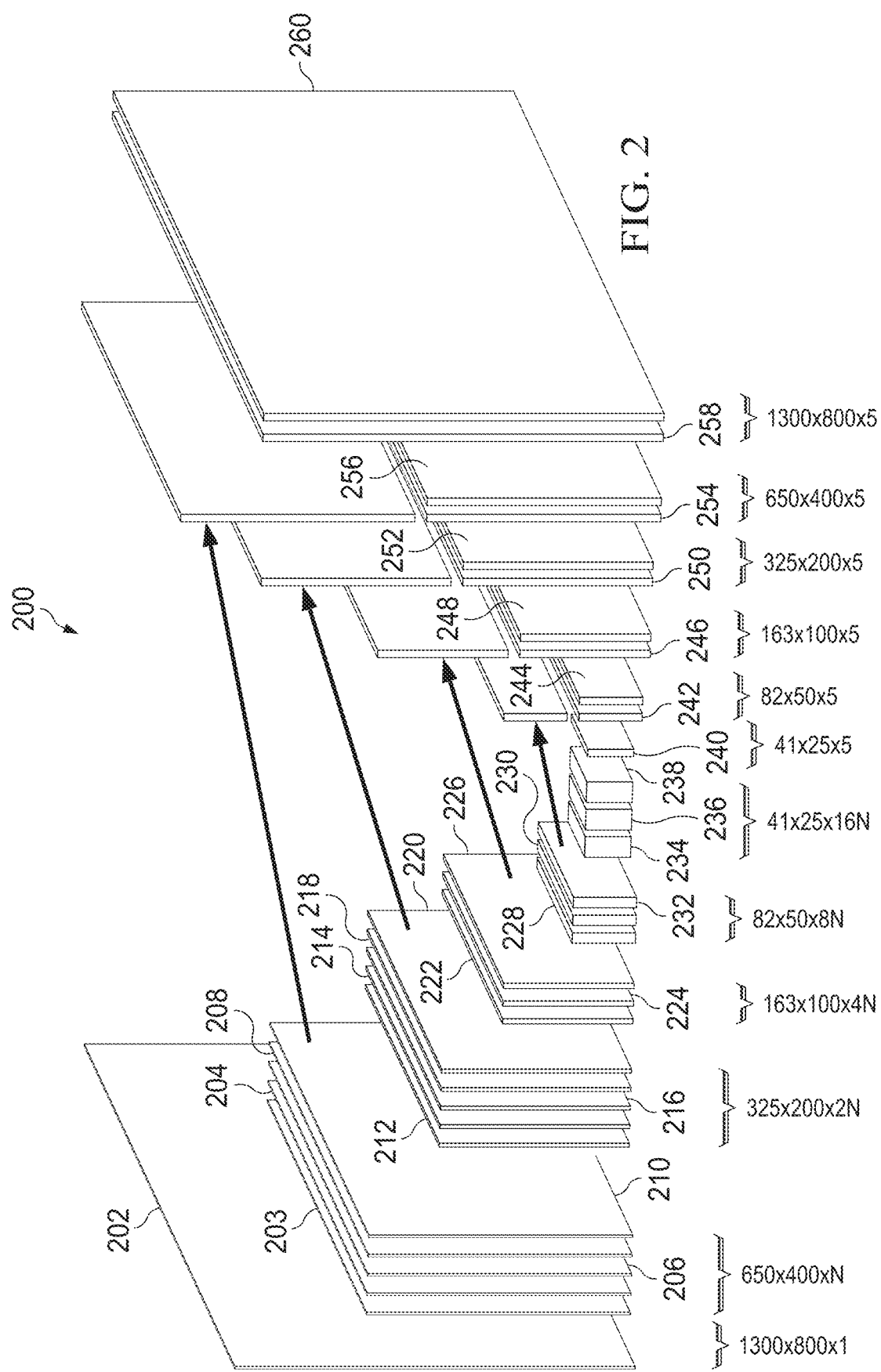
FIG. 2 depicts a diagrammatic representation of a topology of a non-limiting example of a convolutional neural network according to some embodiments.

FIG. 2 depicts a diagrammatic representation of a topology of a non-limiting example of a CNN that is distinctly different from the DL architecture described above. In the example of FIG. 2, each operation is represented by a resulting feature map. Image 202 represents an input to CNN 200. This input is processed from left to right in the figure. In this example, CNN 200 has three parts.

The first part of CNN 200, which is also referred to herein as an encoding process, can include a series of layers that perform various operations, including convolution operations, average pooling operations, max pooling operations layers, and the like, to identify relevant features in the input image (e.g., image 202). These convolutional layers produce a set of feature maps that are smaller than the original input image which, in this example, can be 1300 by 800 pixels. Characteristics of each of the feature maps in the first part of CNN 200 are shown in Table 1 below. These characteristics include height, width, kernel size and number of features.

TABLE 1

| Layers | 202 | 203 | 204-210 | 212 | 214-220 | 222 | 224-226 | 228 | 230-232 | 234 | 236-238 |
|---|---|---|---|---|---|---|---|---|---|---|---|
| Width | 1300 | 650 | 650 | 325 | 325 | 163 | 163 | 82 | 82 | 41 | 41 |
| Height | 800 | 400 | 400 | 200 | 200 | 100 | 100 | 50 | 50 | 25 | 25 |
| Kernel | — | — | 5 × 5 | — | 5 × 5 | — | 3 × 3 | — | 1 × 1 | — | 1 × 1 |
| Features | 1 | 1 | N | N | 2 × N | 2 × N | 4 × N | 4 × N | 8 × N | 8 × N | 16 × N |

In the second part of CNN 200, which is also referred to herein as a heatmap generation process, these reduced-size feature maps are used to generate a set of heat maps, each of which corresponds to the likelihood that a particular type of feature (e.g., text, image, etc.) is present in a specific part of the image. These heat maps can then be processed by the third part of CNN 200, which is also referred to herein as a decoding process, via a series of convolution transpose layers and skip layers to upscale the heat maps to the size of the input image. Ultimately, CNN 200 produces a final set of heat maps (e.g., 260) that are the same size as the original input image, where each of the heat maps shows the probability that a feature of a particular type (e.g., text or an image) is found at each pixel.

In the example of FIG. 2, the first part of the CNN can have five convolutional layers. The first operation performed on the input image is an average pool (203), where each set of 2×2 pixels is averaged, thereby producing an image that is half the size of the input image (650×400 in this example). The reduced-size image then undergoes a first layer of convolutions that has a stack of four operations (204-210), where each of the operations includes a convolution, a batch normalization (see https://www.tensorflow.org/api_docs/python/tf/nn/batch_normalization) and a rectified linear unit (RELU). The convolutions may, in one embodiment, use a 5×5 kernel to produce feature maps that are 650×400 in size and have a number, N, of features.

After the stack of operations in the first layer has been completed, the resulting feature maps are processed by a second convolutional layer. In this layer, a first max pool operation (212) is performed. The max pool operation results in a set of feature maps that are 325×200 pixels in size and have 2N (2*N) features. These feature maps again undergo a stack of four operations (214-220), where each of the operations includes a convolution, a batch normalization and a rectified linear unit. In this embodiment, the convolutions again use a 5×5 kernel. The operations produce feature maps that are 325×200 in size and have 2N features.

After the operations in the second layer has been performed, the resulting feature maps are processed by a third convolutional layer that includes a second max pool operation (222) that results in a set of feature maps which are 163×100 pixels in size and have 4N features. The resulting feature maps are then processed by a stack of two operations (224-226), where each of the operations again includes a convolution, a batch normalization and a rectified linear unit. In this layer, the convolutions use a 3×3 kernel. The operations produce feature maps that are 163×100 in size and have 4N features.

Following completion of the third of convolutions, the resulting feature maps are processed by a fourth convolutional layer that begins with a third max pool operation (228). This max pool operation produces a set of feature maps which are 82×50 in size and have 8N features. This set of feature maps is then processed by a stack of two operations 230-232), where each of the operations includes a convolution, a batch normalization and a rectified linear unit. In this layer, the convolutions use a 1×1 kernel, and the resulting feature maps are 82×50 in size, with 8N features.

After the fourth layer of convolutions is completed, the feature maps are processed by a fifth convolutional layer. The first operation in this layer is a fourth max pool (234). This max pool operation produces a set of feature maps which are 41×25 in size and have 16N features. These feature maps undergo a stack of two operations (236-238), where each of the operations includes a convolution, a batch normalization and a rectified linear unit. In this layer, the convolutions use a 1×1 kernel. The resulting feature maps are 41×25 in size, and have 16N features.

The second part of the CNN is a single convolution operation which produces output layer 240. This operation includes a convolution and a batch normalization. The convolution is performed with a 1×1 kernel and produces a set of heat maps from the feature maps. In one embodiment, the 16N features of the feature maps are used to identify five types of features—text, face, signature, document background, and image background.

Because it is more accurate to have heat maps that are the same size as the input image, the 41×25-pixel heat maps can be upscaled in the third part of the CNN (as optimized by the network) to the size of the input image. This process can be accomplished through the use of four skip layers, and a final upscale layer. Each of the skip layers can include a transposed convolution of the previous feature maps, which is upscaled by a factor of 2. The feature maps from a previous layer go through a convolution layer with a 1×1×5 kernel, and are summed with the output of the upscale layer. It should be noted that, in the example of FIG. 2, each of the operations in the third part of the CNN are performed on the images for each of the five features types—text, face, signature, document background, and image background. For instance, in the first skip layer, a convolution transpose of 41×25 heat map 240 produces 82×50 map 242. This map (242) can then be added to map 232 from the fourth convolution layer to produce 82×50 map 244. This map includes the heat map information of map 242 and the finer-grained map information contained in map 232.

In the second skip layer, a convolution transpose 246 of output map 244 of the first skip layer, upscaled by 2, can be added to map 226 from the third convolution layer to produce map 248. This produces a map having a size of 163×100, which again has the heat map information of map 246 and the finer-grained map information contained in map 226.

Similarly, in the third skip layer, a convolution transpose 250 of the output map of the second skip layer, upscaled by 2, can be added to map 220 from the second convolution layer to produce map 252. Likewise, in the fourth skip layer, a convolution transpose 254 of the output map of the third skip layer, upscaled by 2, can be added to map 210 from the first convolution layer to produce map 256.

The output of the fourth skip layer (map 256) is still smaller than the input image. In the example of FIG. 2, map 256 is 650×400 pixels, as compared to 1300×800 pixels for input image 202. The CNN of FIG. 2 can, therefore, include an upscale operation to produce output layer 258 which is effectively the reverse of the initial average pool operation. Finally, a softmax operation can be performed to produce output layer 260 so that the final heat maps will show probability distributions of the respective features, rather than raw data.

Training of the CNN depicted in FIG. 2 can include performing image recognition processing on the simulated document images to produce a corresponding set of recognition outputs (e.g., identification of features such as text, face, signature, document background, and image background in the image), comparing the recognition outputs to the expected outputs (based on information about the document components) for the images, and adjusting a set of weights of the CNN in dependence upon differences between the recognition outputs and the expected outputs for the images.

The weights used in the convolution layers represent the knowledge of the underlying system—what the machine learns from the training data (which, in this case, comprises simulated document images generated internally from document components). Eventually, the learning process converges, at which time the machine stops learning from the training data. When that occurs, the weights will no longer be adjusted or updated and the CNN with the final weights is considered trained.

In the above example, the CNN is trained to recognize five features types—text, face, signature, document background, and image background. Of these feature types, signature is perhaps the most difficult one for a machine to detect and recognize. There are many reasons. Signatures have no defined shape, size, or style. Some can be written in a block letter style similar to printed words, which can confusing to a machine. Some can be initials. Some can look like drawings. Some can be very small. Some can be placed anywhere (e.g., in the foreground or background of text, between lines of a paragraph, at the margin, etc.) in any orientation on a page. Some can be written very lightly to look like thin lines. The volatile nature of signatures makes it difficult to automatically detect signatures in document images.

As described above, it is possible to train a neural network (e.g., CNN 200) with complete images to recognize various types of features. Once trained, the neural work can be used to classify whether an image contains a signature. However, this approach needs lots of data samples (e.g., 35K plus documents) and can take a long time (e.g., two weeks per training). Particularly, when documents contain mostly texts that are mixed sometimes with a signature, it can take a lot more time to train a machine to differentiate a signature from regular document text.

To this end, in some cases, an expert system can be leveraged to aid a neural network in detecting signatures in document images. This is a two-step approach in which ML technology is utilized to process document images and produce recognition outputs. The recognition outputs are provided to an expert system which applies some heuristics (rules) to determine whether an output from the ML model is more likely than not a signature. This two-step approach has drawbacks. For instance, neural networks can be trained to predict the bounds of objects detected in the images. Detecting object bounds is a regression problem where it is trained with bounds. There are various architectures for bounds detection. However, because each individual box must be trained so that a network may learn the size of object, this training process can be slow and hard to optimize, even with the use of an expert system. Further, neural networks can be trained to detect the pixels and a predicted pixel heatmap can be used to detect bounds with an expert system by connected components and filtering. However, the expert system would need adjustments for all kinds of unseen variations and the rules used by the expert system would need to be maintained.

Embodiments disclosed herein provide a new approach to detecting signatures in document images. This approach enables a system to classify, without having to rely on an expert system, whether an image contains a signature. This is achieved by adding a branch to the neural network described above for classification at the segmentation level. The technique used to classify objects by classifying certain pixels of an image as being part of an object is called "pixel-level object detection and segmentation." With this technique, a neural network with all convolution layers is trained to making a prediction for all pixels at once. This means that each pixel in the image has a label. As discussed below, this fine-grained pixel-level object detection and segmentation can be quite inefficient in some cases. The new approach disclosed herein facilitates the detection of pixels belonging to an object and applies additional steps in detecting the bounds of the object where the pixels are grouped to mark the object (which is referred to herein as a region). The image is classified based on region(s) thus detected. This reduces the scope of images for learning and generalization for classification so that the machine does not need to learn from complete images. This also allows the machine to be trained faster and shortens the training time.

Further, this approach allows a machine to learn continuously. As discussed above, while some neural networks can be trained to classify images pertaining to various feature types including signature, the training stops when the machine converges and the weights reach a state where no more adjustments could be made. As the training progresses, any error made by any part of the neural network in one operation is carried to the next operation and/or next part of the neural network. Such errors can skew the adjustments made to the weights. By the time the training stops, the final weights could be so off that the accuracy of the neural network would be adversely affected. For this reason, neural networks can generally achieve only about 80% recognition accuracy, even when run on very large hardware architecture.

An object of the invention disclosed herein is to achieve a recognition accuracy beyond 80%, to 96% or better, or about 1.5 times more accurate. Another object of the invention disclosed herein is to significantly shorten the training time and/or reduce the number of samples needed.

Figure 3:
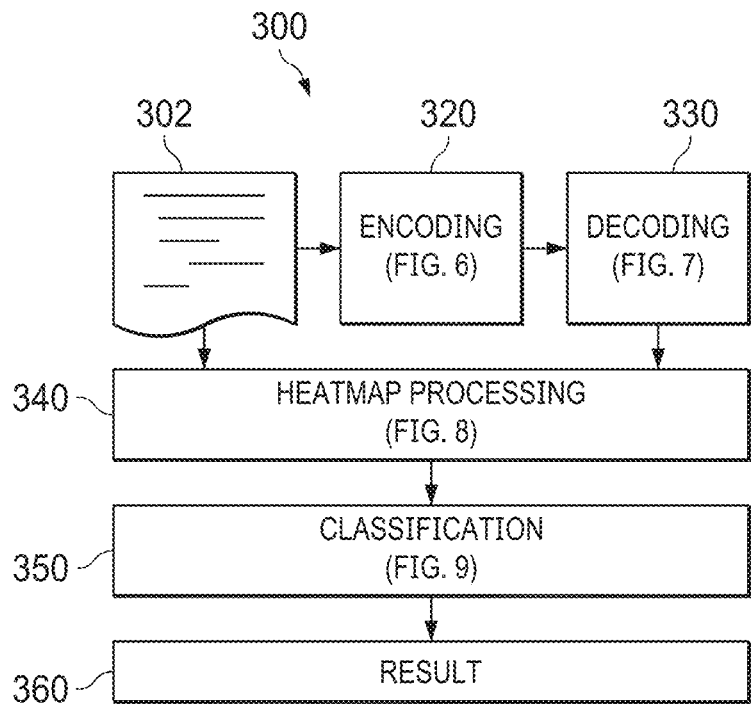
FIG. 3 depicts a diagrammatic representation of a deep learning architecture implementing an extended segmentation neural network according to some embodiments.

In some embodiments, these and other objects of the invention can be achieved in an AI system implementing a DL architecture shown in FIG. 3. As a non-limiting example, neural network 300 can be developed for image classification using available ML framework and libraries such as TensorFlow.

Referring to FIG. 3, neural network 300 can include encoding process 320, decoding process 330, heatmap processing 340, and classification 350. The training and testing of neural network 300 follow the same flow shown in FIG. 3 in which input images 302 are fed to neural network 300 and, for each image, neural network 300 generates result 360 indicating whether that image contains a signature. A more detailed example of this flow is illustrated in FIG. 4.

Figure 4:
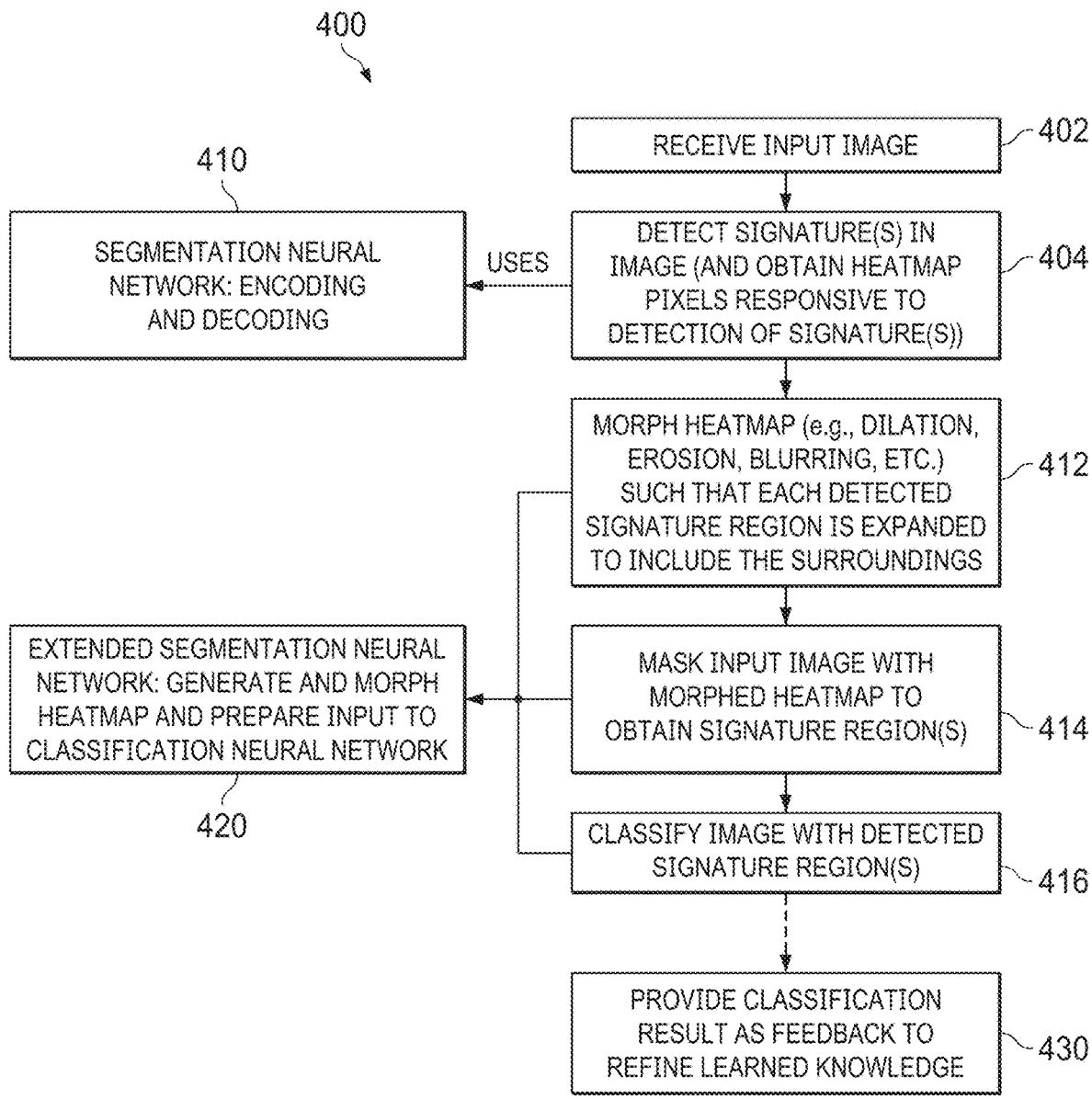
FIG. 4 depicts a flow diagram illustrating a method for processing images through an extended segmentation neural network according to some embodiments.
Figure 5:
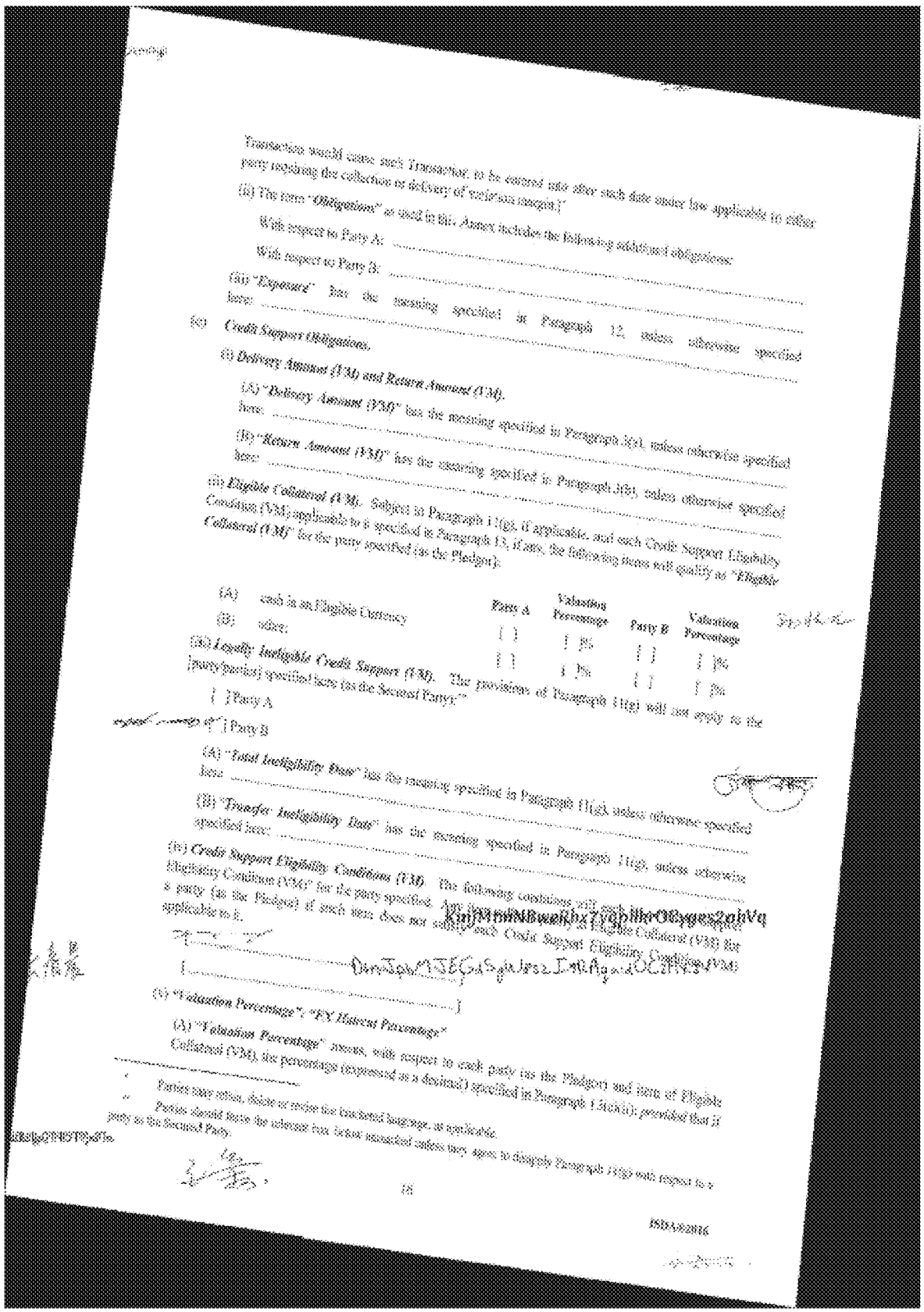
FIG. 5 is a non-limiting example of an input image of a document.

In the example of FIG. 4, flow 400 can begin with receiving an input image (402). An example of an input image is shown in FIG. 5. Image 500 can be an image of an actual physical document or a simulated document generated from document components as describe above. In some cases, the received image can be pre-processed, for instance, to linearize and center the image, convert color in the image to gray scale, and normalize the grayscale to a range from −0.5 to 0.5. Normally, each of the colors of an image (typically red, green, blue) are processed as separate layers. Converting the image to a gray scale (typically ranging from 0-255) reduces these three layers to a single layer. This reduction can increase the processing speed of the system. Further, the gray scale is normalized from the range of 0 to 255 to a range of −0.5 to 0.5 to improve the learning quality of the system. In some cases, it may be more desirable to improve the recognition accuracy of the system than to increase the processing speed. In such cases, the original colors of the image may be retained and the image may be processed with a separate pass for each of the colors. It may even be desirable to perform color separation into additional layers (e.g., defining layers for six different colors) and processing the image for each of these layers to provide improved recognition at the expense of processing speed (which would be ⅙ as fast as when the colors were converted to a gray scale). Accordingly, this image pre-processing step can be optional and can vary from implementation to implementation.

Figure 6:
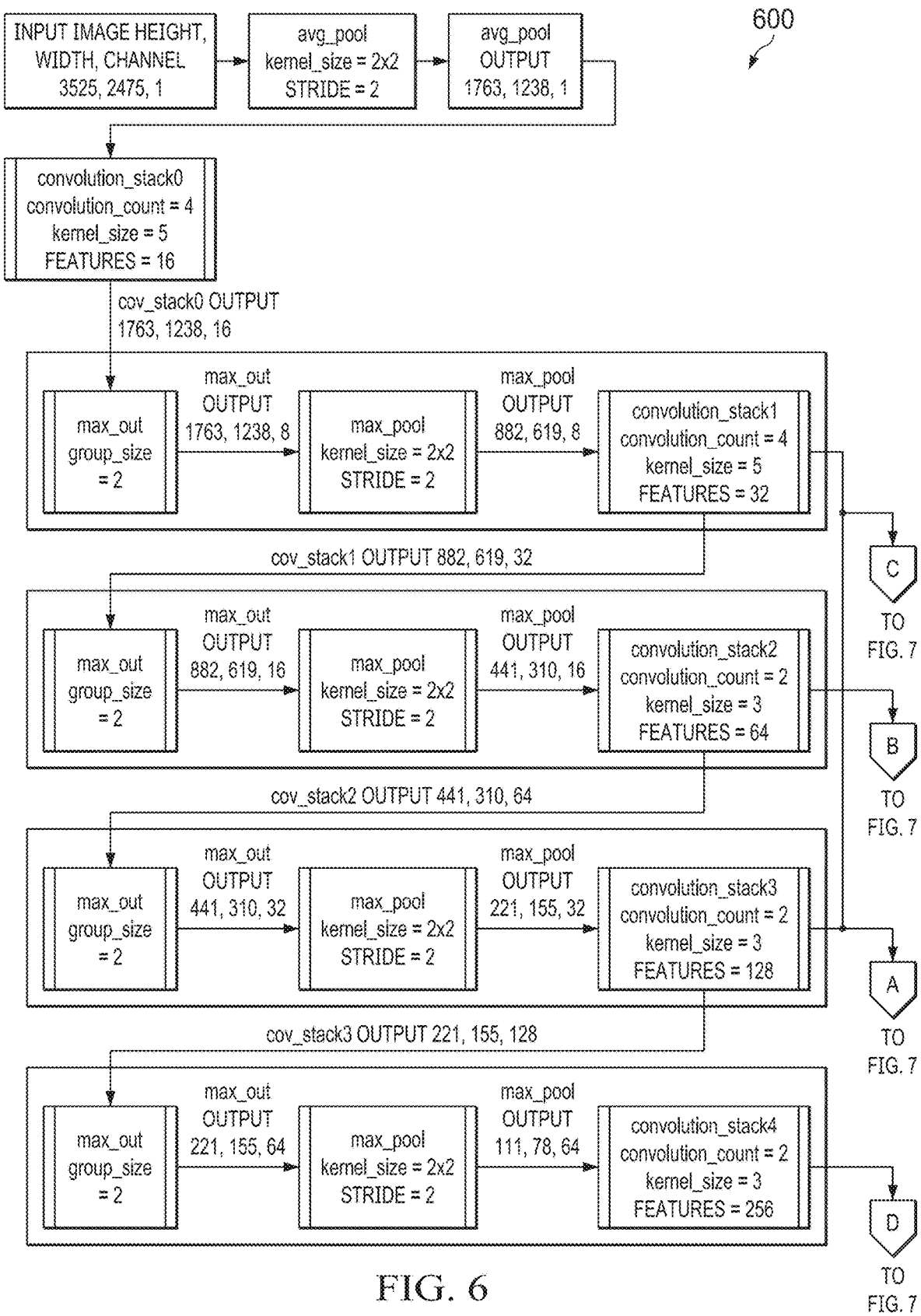
FIG. 6 depicts a diagrammatic representation of an encoding process according to some embodiments.
Figure 7:
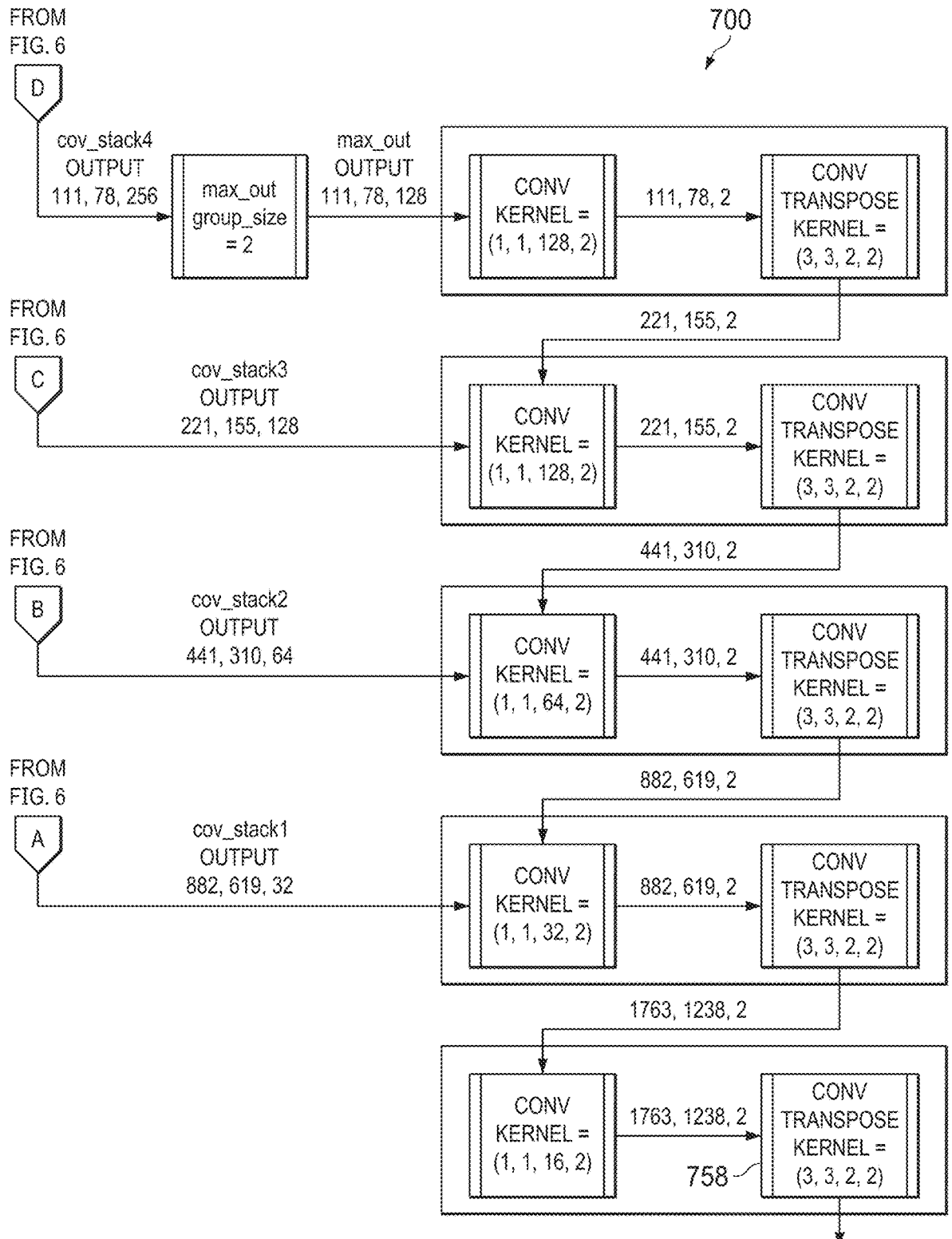
FIG. 7 depicts a diagrammatic representation of a decoding process according to some embodiments.

Next, the image is input to a neural network to detect any signature in the image and, for any signature thus detected, obtain corresponding heatmap pixels (404). Similar to the CNN described above with reference to FIG. 2, this neural network uses multiple convolutional layers to detect increasingly complex features in the image. As illustrated in FIG. 4, this detection can entail utilizing a segmentation neural network which performs encoding and decoding processes (410). An example of encoding process 600 is illustrated in FIG. 6. An example of decoding process 700 is illustrated in FIG. 7. The encoding and decoding processes shown in FIGS. 6 and 7 are similar to the encoding and decoding processes described above with reference to FIG. 2.

Figure 8:
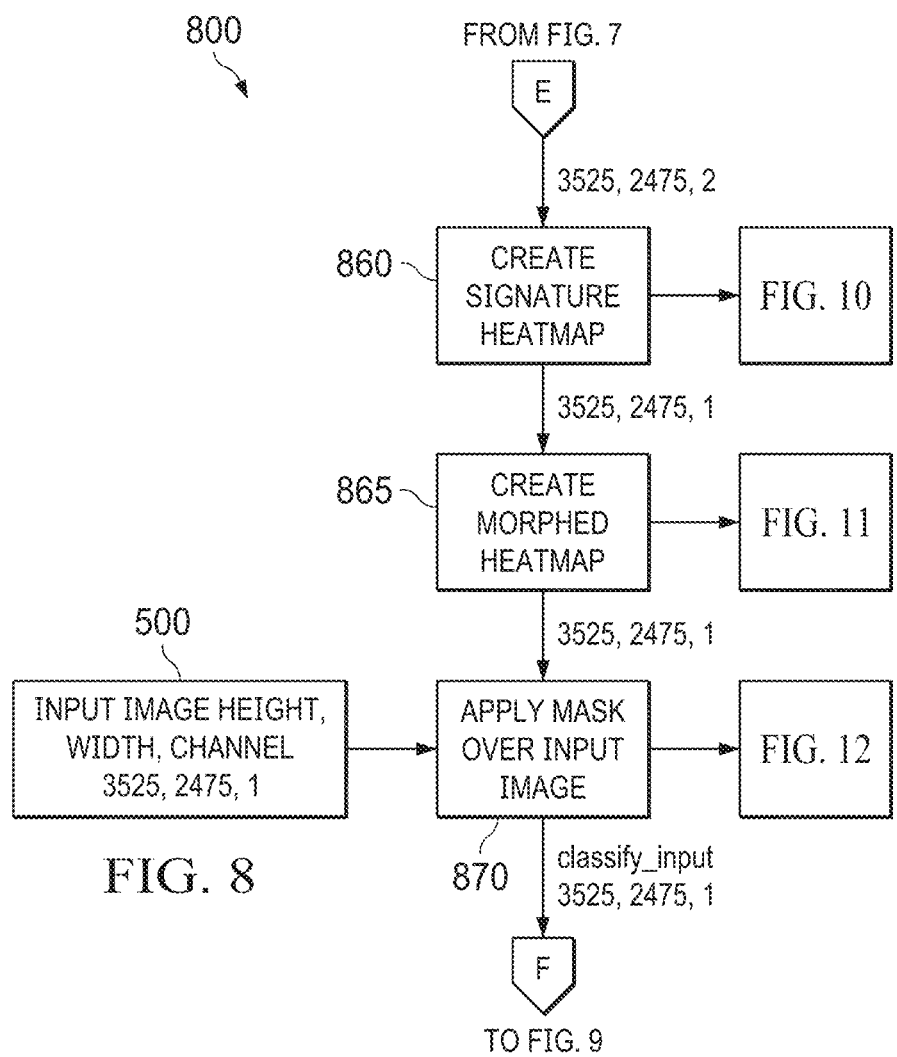
FIG. 8 depicts a flow diagram illustrating a method of heatmap processing according to some embodiments.
Figure 10:
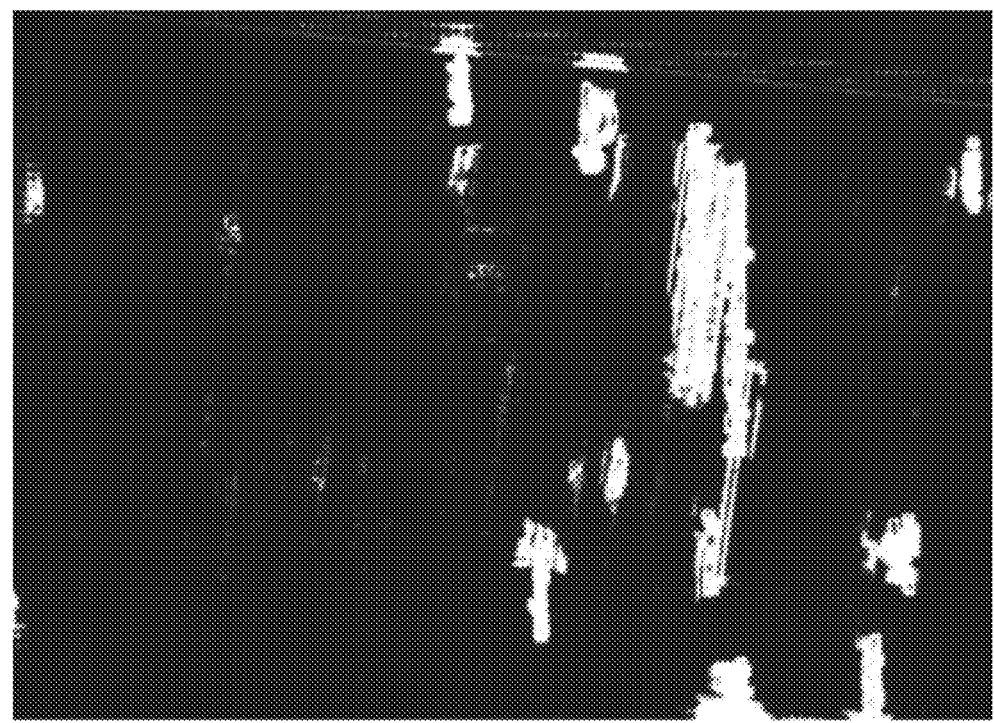
FIG. 10 is a non-limiting example of a signature heatmap.

Referring to FIG. 7, at the end of decoding process 700, the output from the fifth convolution transpose (element 758) is upscaled by 2 back to the size of the input image. Referring to FIG. 8, this upscale operation produces a signature heatmap that shows a probability distribution of the signature feature type over the original image (860). An example of a signature heatmap is shown in FIG. 10. As illustrated in FIG. 10, signature heatmap 1000 indicates a probability of finding a certain feature type (e.g., signature) at each pixel in the original image (e.g., input image 500).

Referring to FIG. 4, this pixel-level probability distribution is the output of the segmentation neural network (410) which is used to generate a heatmap for the signature feature type (a "signature heatmap") (404). According to flow 400, this signature heatmap is further processed through an extended segmentation neural network for classification.

In some embodiments, the signature heatmap is dilated and/or eroded to expand the areas indicated by the pixels as likely to contain the signature feature type (412). This creates a morphed heatmap. The morphed heatmap can serve as a mask over the input image to obtain the signature region(s) in which each signature detected in the signature map is obtained with contextual information that surrounds the signature (414). This produces an image with segmented signature region(s). The image with the segmented signature region(s) is then classified to detect whether the image contains a signature or not (416). The heatmap processing and classifying steps (412-416) can be done using an extended segmentation neural network (420), as further explained below.

Referring to FIG. 8, heatmap processing 800 can include creating a signature heatmap from an output provided by decoding process 700 (e.g., through an upscale operation as described above) (860). The signature heatmap indicates, at the pixel level, the probability of each pixel's feature type being that of a signature. In the example of FIG. 10, a white pixel in signature heatmap 1000 indicates that the white pixel is, more likely than not, of a signature feature type. One or more morphological image processing operations, such as dilation, erosion, blurring, etc., can be applied to the signature heatmap to create a morphed heatmap (865). Dilation makes objects more visible and fills in small holes in the object. Erosion removes pixels from the boundary of an "island" or a small object. Blurring can obscure certain details of an object. Those skilled in the art appreciate that any suitable morphological image processing operation(s) may be applied to generate a morphed heatmap. Morphological image processing operations are known to those skilled in the art and thus are not further described herein.

Morphological image processing operations can help to take into account the noise that comes with located/detected signature(s) in real images and improve the variation in training of classification. A non-limiting example of a morphed heatmap is illustrated in FIG. 11.

Figure 11:
FIG. 11 is a non-limiting example of a morphed heatmap.
Figure 12:
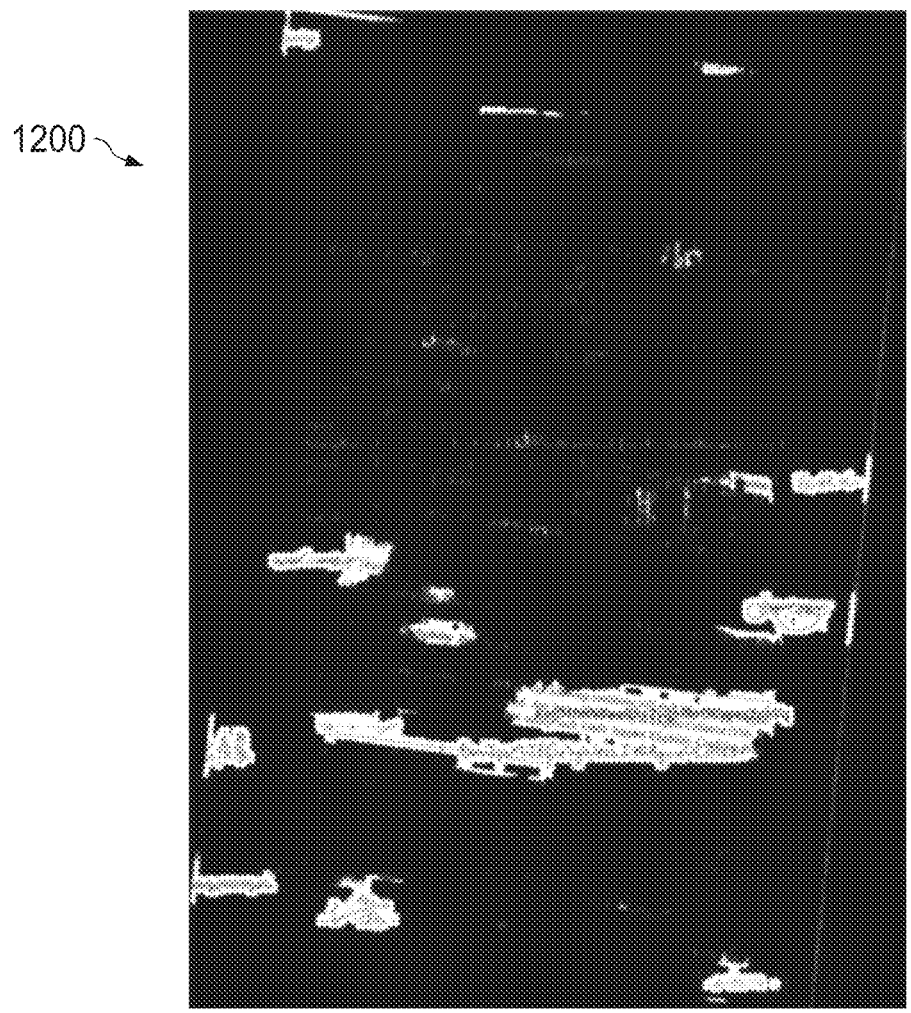
FIG. 12 is a non-limiting example of an input image masked with a morphed heatmap.

As illustrated in FIG. 11, morphed heatmap 1100 is essentially signature heatmap 1000 with details removed and/or surrounding pixels added. The morphed heatmap thus created can be used as a mask and, when applied over the input image (e.g., input image 500) (870), can create an image showing detected signature region(s) or part(s), an example of which is shown in FIG. 12. Notice the signature regions or parts shown in image 1200 do not have a defined or fixed size, shape, or position. Nor are they very precise or fine-grained. This allows the "noise" surrounding each signature to be taken into account for classification. Since image 1200 represents only a certain feature type (which, in this case, is of the signature type) detected from the original input image, the identified/detected region(s) or part(s) can be referred to as "segmented" signature region(s) or part(s).

Skilled artisans appreciate that the example shown in FIG. 12 is illustrative and non-limiting. Depending upon the morphological image processing operation(s) applied to the signature heatmap to create the morphed heatmap, different kinds of masks could be created.

Figure 13A:
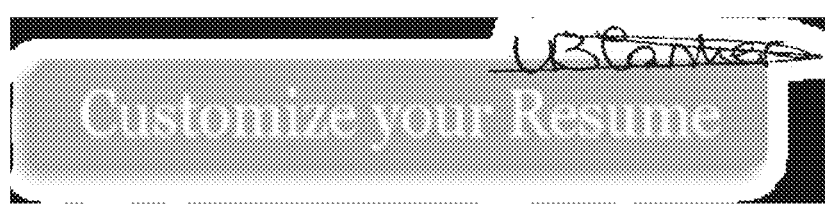
FIG. 13A is an example of a signature object with its surrounding area included in a masked image.
Figure 13B:
FIG. 13B is an example of the signature object of FIG. 13A without its surrounding area included in a masked image.

Signatures (which, in this disclosure, can mean any handwriting on a printed document) are often mixed with text (in the foreground and/or the background) on a document. Signatures do not have any bounds or specific structure. Words in a signature can be separate or merged. Letters in a signature do not necessarily look like letters. Lines in a signature can be broken. Given this volatile nature, the fine-grained pixel-level object detection and segmentation may not be the most efficient way for a machine to learn. Morphing the heatmap and using the morphed heatmap to create an image with detected signature region(s) or part(s) enables a neural network (e.g., CNN 900) to use blocks of rectangles in the image as references for a class. This allows the neural network to, based on details or "noise" in the surrounding area of each detected signature region or part, understand quicker the context of the detected signature region or part. For instance, the image shown in FIG. 13A includes the surrounding area and the image shown in FIG. 13B does not. In FIG. 13B, the context of the signature object is unclear. In FIG. 13A, the surrounding area includes words that can be used as reference to improve the clarity of the signature object and can be used to contrast whether the signature object is in the foreground or the background.

Figure 9:
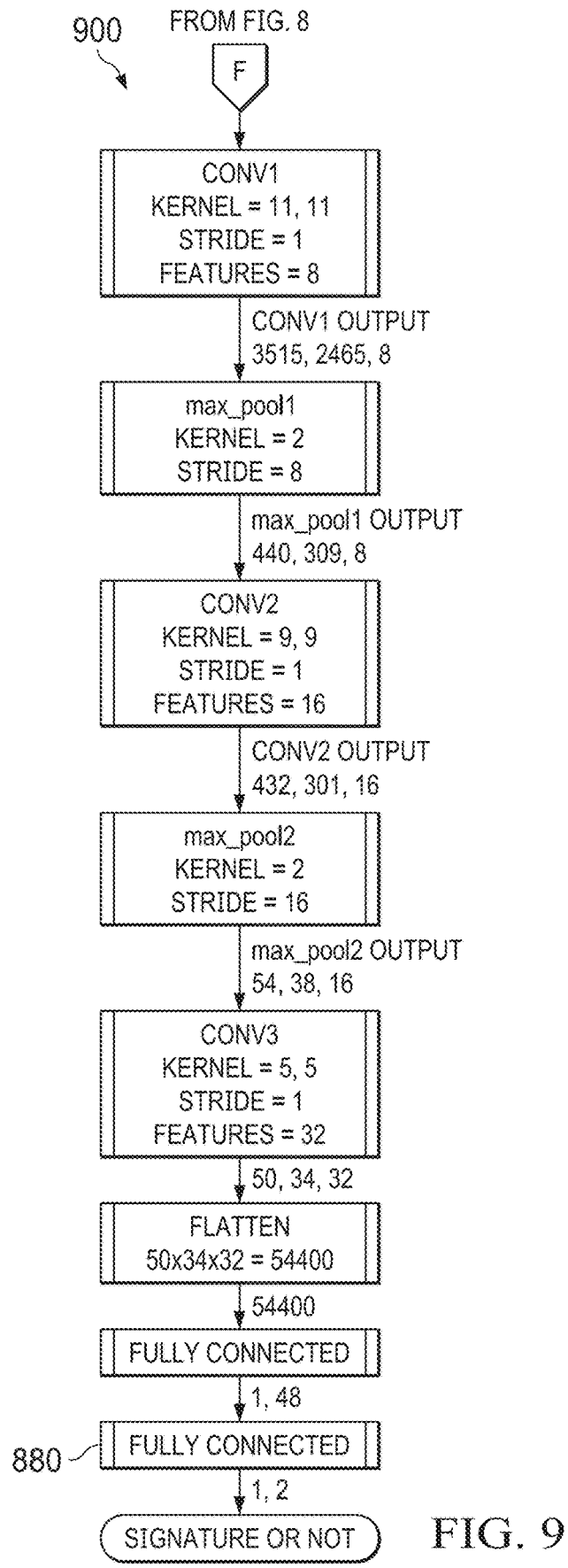
FIG. 9 depicts a diagrammatic representation of a classification neural network according to some embodiments.

Referring to FIG. 9, the image with the segmented signature region(s) or part(s) is input to CNN 900. As illustrated in FIG. 9, CNN 900 is layered with three convolution layers alternating with two max pooling layers to reduce the dimension of the signal to the next layer. Each max pooling layer uses the maximum value from each of a cluster of neurons at the previous layer. After the third convolution layer, the neurons are flattened into a matrix and the flattened matrix goes through a fully connected layer to produce an output layer (800) in which a classification result—whether the image contains a signature or not—is generated.

CNN 900 is trained on the complete structure of rectangles or blocks in an input image that indicate where signature(s) can be found. Every time the machines tries to label a region, it makes a determination as to whether the entire image contains a signature. Since the majority of texts in the input image is usually removed (e.g., image 1200), it is easy and fast for a machine to learn the feature type of interest (i.e., signatures) for classification. The granularity is not as precise as the pixel-level object detection. This allows for tolerance of signatures merged or mixed with text.

To this end, CNN 900 functions as a "branch" or an "extension" of the segmentation neural network described above (e.g., segmentation neural network 410, which includes encoding process 320, 600 and decoding process 330, 700) to classify a recognition output from the segmentation neural network. This "branching" is facilitated by the heatmap processing (e.g., heatmap processing 800), which prepares the input image to CNN 900. In turn, CNN 900 tries to infer, based on the output from the previous step, whether the image contains a signature and returns a classification result indicating whether the image contains a signature. This new branch can be built into the DL framework to provide additional feedback to the overall training process for the entire neural network (e.g., neural network 300), which can be referred to as an extended segmentation neural network.

As discussed above, with only segmentation loss, accuracy of the segmentation output plateaus after a while. With additional classification loss, the segmentation accuracy improves significantly. While segmentation boosts the classification in the forward process, the segmentation-level classification branch enhances the segmentation during the backward process which provides the feedback to the network. In this way, the network has two outputs that can be applied depending on usage: 1) segmentation and classification output both or 2) segmentation output or classification output independently.

This additional feedback is also provided by the new branch at a much earlier stage of classification. For instance, with the pixel-level object detection and segmentation, the output is at the pixel level and no conclusion about the overall image is made at that point. Once the segments are identified at the pixel level, a conclusion (e.g., classification by document type) is then made for the overall image based on the segments thus identified. With this approach, no classification is done at the segment level with respect to the whole document image.

With CNN 900, classification is performed at the segment level. That is, when a machine is processing a segment, it tries to infer whether the image itself likely contains a signature. It can learn from positive examples (e.g., text documents with a signature(s)) and negative examples (e.g., text documents without any signature) and fine tune its knowledge by adjusting the weights used. What the machine learns from this training process can help it make a more accurate prediction on whether a new image of a document, that it has not seen before, contains a signature. The inclusion of CNN 900 can expedite the learning process and help the machine to learn better (e.g., improving accuracy by more than 150%) and/or more efficiently (e.g., less learning sessions).

Figure 14:
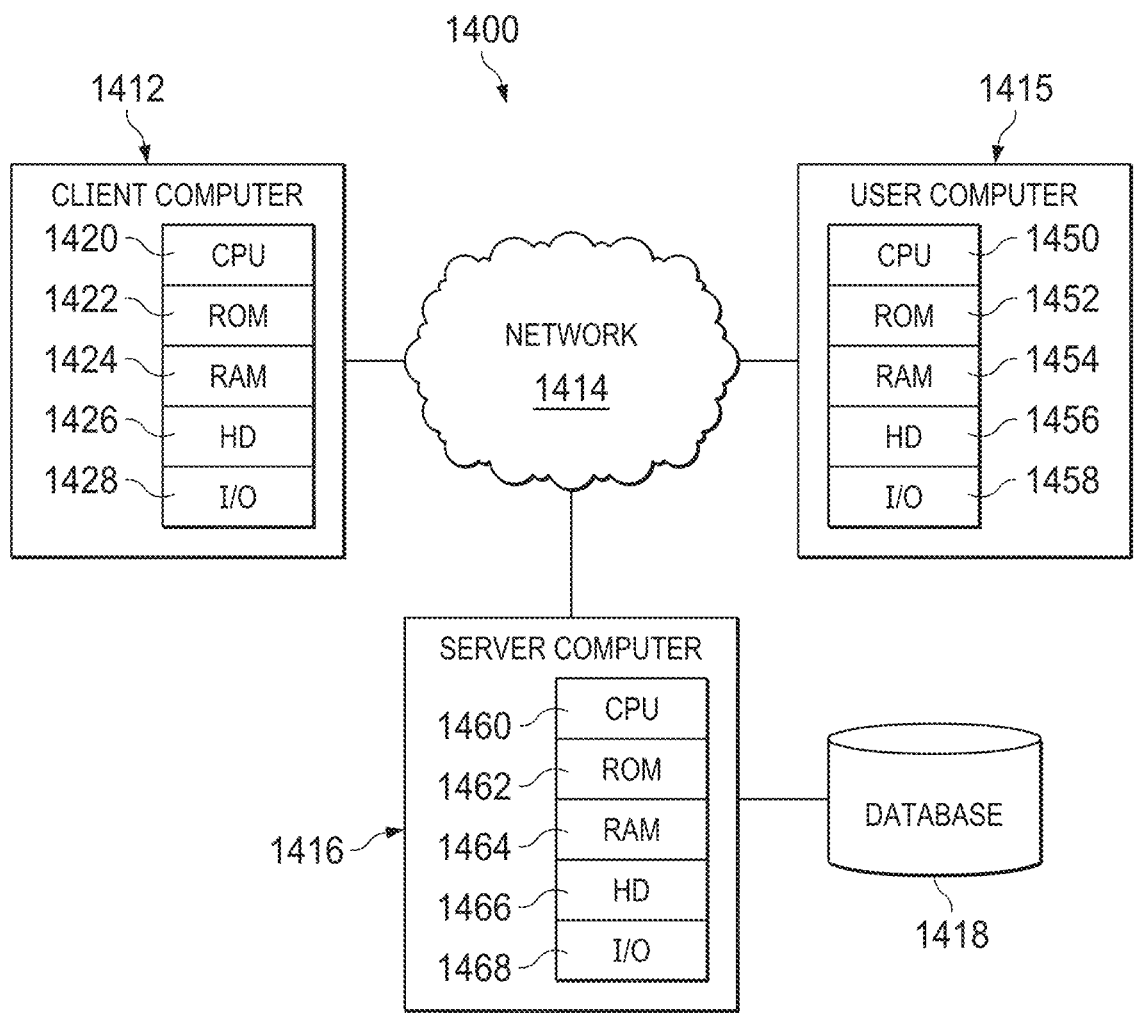
FIG. 14 depicts a diagrammatic representation of a distributed network computing environment where embodiments disclosed can be implemented.

FIG. 14 depicts a diagrammatic representation of a distributed network computing environment where embodiments disclosed herein can be implemented. In the example illustrated, network computing environment 1400 includes network 1414 that can be bi-directionally coupled to computer 1412, computer 1415, and computer 1416. Computer 1416 can be bi-directionally coupled to data store 1418. Network 1414 may represent a combination of wired and wireless networks that network computing environment 1400 may utilize for various types of network communications known to those skilled in the art. In one embodiment, computer 1412 may capture images that are provided via network 1414 to computer 1416, which recognizes and extracts information from the images as disclosed in more detail below. The information extracted from the images may be classified and otherwise interpreted and provided to backend systems implemented on computer 1415.

For the purpose of illustration, a single system is shown for each of computer 1412, computer 1415, and computer 1416. However, with each of computer 1412, computer 1415, and computer 1416, a plurality of computers (not shown) may be interconnected to each other over network 1414. For example, a plurality of computers 1412 and a plurality of computers 1415 may be coupled to network 1414. Computers 1412 may include data processing systems for communicating with computer 1416. Computers 1415 may include data processing systems for individuals whose jobs may require them to configure services used by computers 1412 in network computing environment 1400.

First enterprise computer 1412 can include central processing unit ("CPU") 1420, read-only memory ("ROM") 1422, random access memory ("RAM") 1424, hard drive ("HD") or storage memory 1426, and input/output device(s) ("I/O") 1428. I/O 1428 can include a keyboard, monitor, printer, electronic pointing device (e.g., mouse, trackball, stylus, etc.), or the like. Computer 1412 can include a desktop computer, a laptop computer, a personal digital assistant, a cellular phone, or nearly any device capable of communicating over a network. Computer 1415 may be similar to computer 1412 and can comprise CPU 1450, ROM 1452, RAM 1454, HD 1456, and I/O 1458.

Likewise, computer 1416 may include CPU 1460, ROM 1462, RAM 1464, HD 1466, and I/O 1468. Computer 1416 may include one or more backend systems configured for providing a variety of services to computers 1412 over network 1414. These services may utilize data stored in data store 1418. Many other alternative configurations are possible and known to skilled artisans.

Each of the computers in FIG. 14 may have more than one CPU, ROM, RAM, HD, I/O, or other hardware components. For the sake of brevity, each computer is illustrated as having one of each of the hardware components, even if more than one is used. Each of computers 1412, 1415, and 1416 is an example of a data processing system. ROM 1422, 1452, and 1462; RAM 1424, 1454, and 1464; HD 1426, 1456, and 1466; and data store 1418 can include media that can be read by CPU 1420, 1450, or 1460. Therefore, these types of memories include non-transitory computer-readable storage media. These memories may be internal or external to computers 1412, 1415, or 1416.

Portions of the methods described herein may be implemented in suitable software code that may reside within ROM 1422, 1452, or 1462; RAM 1424, 1454, or 1464; or HD 1426, 1456, or 1466. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

As is known to those skilled in the art, a suitable computer system can include a CPU, a ROM, a RAM, a HD, and I/O device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. An image processing method, comprising:
   receiving, by a computer, an input image;
   detecting, by the computer utilizing a segmentation neural network, pixels in the input image having a particular feature type;
   generating, by the computer based on the pixels in the input image having the particular feature type, a heatmap of the input image;
   generating, by the computer from the heatmap, a morphed heatmap with contextual information on the pixels in the input image having the particular feature type;
   detecting, by the computer, an object or region in the input image by masking the input image using the morphed heatmap; and
   classifying, by the computer based at least on the object or region, the input image.

2. The method according to claim 1, wherein the heatmap represents a probability distribution of the particular feature type in the image.

3. The method according to claim 1, wherein generation of the morphed heatmap comprises applying a morphological image processing operation.

4. The method according to claim 1, wherein the particular feature types is one of: text, face, signature, document background, and image background.

5. The method according to claim 4, wherein the classification result is provided to the machine learning framework as feedback to a training process.

6. The method according to claim 1, wherein the segmentation neural network comprises an encoding process and a decoding process and wherein the classifying utilizes an encoding process for segment-level classification.

7. The method according to claim 1, wherein the input image comprises an image of a physical document or a simulated document created from document components.

8. A system, comprising:
   a processor;
   a non-transitory computer-readable medium; and
   stored instructions translatable by the processor, the stored instructions when translated by the processor further perform:
   receiving an input image;
   detecting, utilizing a segmentation neural network, pixels in the input image having a particular feature type;
   generating, based on the pixels in the input image having the particular feature type, a heatmap of the input image;
   generating, from the heatmap, a morphed heatmap with contextual information on the pixels in the input image having the particular feature type;
   detecting a object or region in the input image by masking the input image using the morphed heatmap; and
   classifying, based at least on the object or region, the input image.

9. The system of claim 8, wherein the heatmap represents a probability distribution of the particular feature type in the image.

10. The system of claim 8, wherein generation of the morphed heatmap comprises applying a morphological image processing operation.

11. The system of claim 8, wherein the particular feature types is one of: text, face, signature, document background, and image background.

12. The system of claim 11, wherein the classification result is provided to the machine learning framework as feedback to a training process.

13. The system of claim 8, wherein the segmentation neural network comprises an encoding process and a decoding process and wherein the classifying utilizes an encoding process for segment-level classification.

14. The system of claim 8, wherein the input image comprises an image of a physical document or a simulated document created from document components.

15. A computer program product comprising a non-transitory computer-readable medium storing instructions translatable by a processor of a computer, the instructions when translated by the processor perform:
   receiving an input image;
   detecting, utilizing a segmentation neural network, pixels in the input image having a particular feature type;
   generating, based on the pixels in the input image having the particular feature type, a heatmap of the input image;
   generating, from the heatmap, a morphed heatmap with contextual information on the pixels in the input image having the particular feature type;
   detecting a object or region in the input image by masking the input image using the morphed heatmap; and
   classifying, based at least on the object or region, the input image.

16. The computer program product of claim 15, wherein the heatmap represents a probability distribution of the particular feature type in the image.

17. The computer program product of claim 15, wherein generation of the morphed heatmap comprises applying a morphological image processing operation.

18. The computer program product of claim 15, wherein the particular feature types is one of: text, face, signature, document background, and image background.

19. The computer program product of claim 18, wherein the classification result is provided to the machine learning framework as feedback to a training process.

20. The computer program product of claim 15, wherein the input image comprises an image of a physical document or a simulated document created from document components.

* * * * *